Dec. 6, 1966 B. WARRINGTON ETAL 3,289,846
FILTRATION OR DIALYSIS SUPPORT APPARATUS
Filed Feb. 24, 1964 2 Sheets-Sheet 2
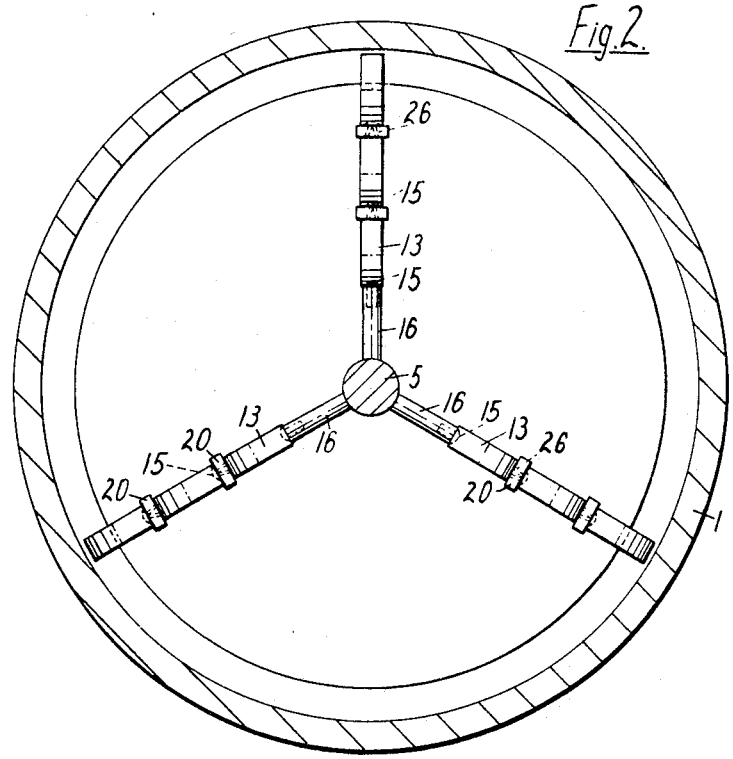
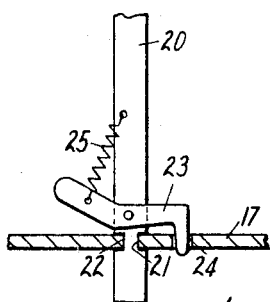
Inventors
BERT WARRINGTON
LEONARD WILLIAM JEROME BISHOP
FRANK WILLIAM WOOD
BY Bacon & Thomas Attorneys 3,289,846
FILTRATION OR DIALYSIS SUPPORT APPARATUS
Bert Warrington, Rockland, Sandy Rise, Chalfont St. Peter, England; Leonard William Jerome Bishop, "Greenways" Pennington Road, Beaconsfield, England; and Frank William Wood, 159 Langley Road, Slough, England
Filed Feb. 24, 1964, Ser. No. 346,737
Claims priority, application Great Britain, Mar. 4, 1963, 8,533/63
15 Claims. (Cl. 210—232)

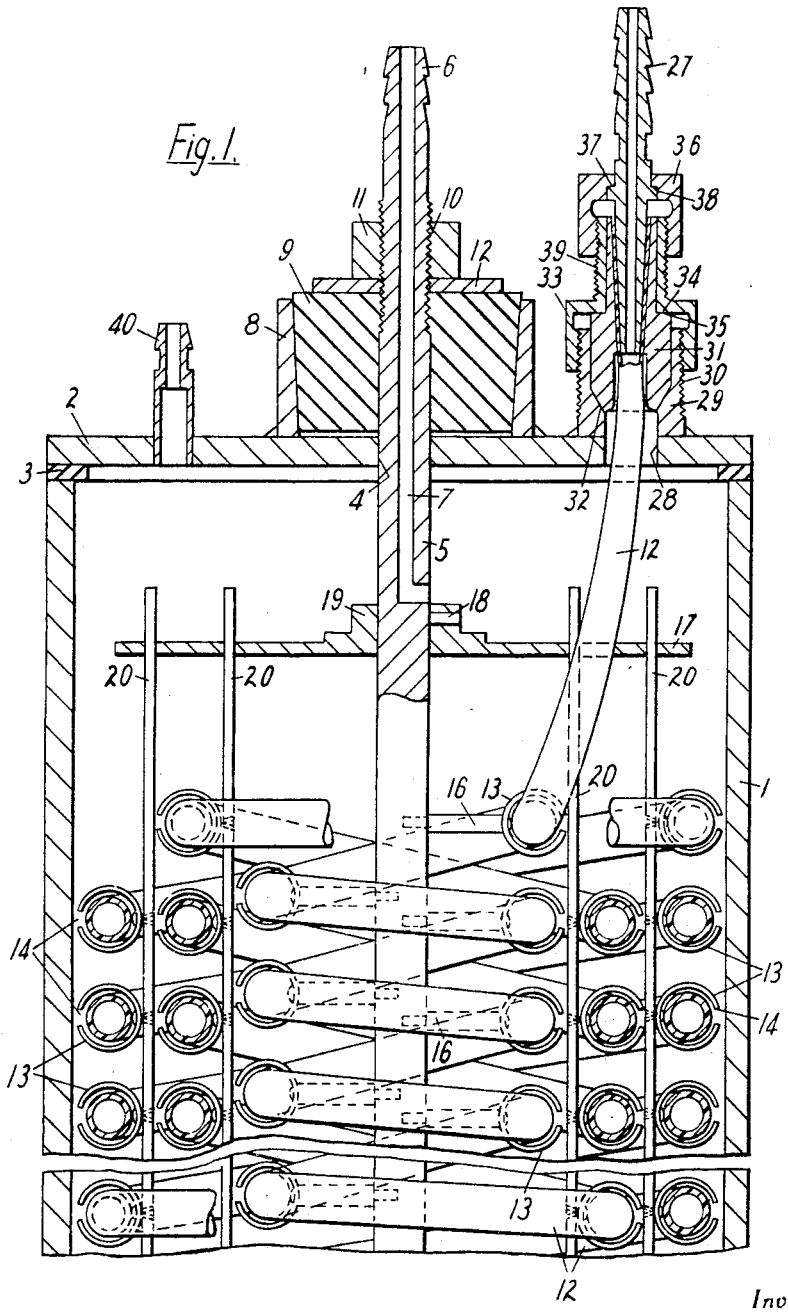

This invention relates to filtration or dialysis apparatus and is particularly directed to improvements in apparatus for carrying out ultra-filtration, of the kind in which small molecules are filtered through a semi-permeable membrane, the rate of filtration being dependent on the difference in the absolute pressures at the two surfaces of the membrane. Filtration apparatus of this general kind is frequently employed when it is desired to concentrate a solution or suspension, such as in the preparation of vaccines.

It is one object of the present invention to provide a former for use in supporting such a membrane in filtration or dialysis apparatus, by the use of which such apparatus may be quickly and easily set up and disassembled and is also of a more compact nature than has hitherto been available.

Thus, according to the invention, there is provided a former for supporting a tubular semi-permeable membrane in filtration or dialysis apparatus, including a plurality of apertured supports arranged to support said membrane therein at intervals along its length in a compact predetermined coiled configuration free from sharp transitions in direction, each such apertured support having a peripheral opening through which the membrane, when in a flattened condition, can be passed laterally into the apertured support.

The arrangement may be such that the membrane is supported in a helical configuration or in the form of two or more concentric helices or as a flat coil or, indeed, in any convenient and compact coiled configuration.

Although the said supports may, if desired, be rigidly mounted and arranged so that a membrane will be supported without sharp transitions in its direction, we prefer to provide such supports with limited freedom of movement so that when a membrane supported thereby is filled with liquid to be filtered, they will tend to take up positions coaxial with such membrane so as to minimise kinking thereof. Thus, in a preferred form of the invention, some or all of the said supports will be mounted for rotation about axes perpendicular to their own axes, and may even be loosely mounted so as to be capable of limited movement in a number of planes to accommodate the configuration naturally taken up by the membrane when it is filled with liquid.

If desired the said supports may be arranged in groups each of which provides a flat coiled path for a membrane, the planes of all of such groups being parallel and the coils being coaxially arranged. A membrane would then be wound, during assembly, on each coil in turn from one end of the former to the other.

Assembly is, however, facilitated if the supports are arranged along at least one helical path. The said former may then include a central supporting shaft lying on the axis of the helix and having the said supports provided therearound, for example by being mounted in cantilever fashion on short spigots stemming from the central shaft. In one embodiment, we have found that a tubular membrane may be satisfactorily supported if at least three supports are provided on each complete turn of the helix.

The pitch of the helix may, of course, be chosen to provide as many convolutions as are necessary to accommodate the length of membrane to be used in practice, but will, in the interests of compactness, preferably be comparatively small.

Very advantageously, and in accordance with a further feature of the invention, the supports may be arranged, in use, to form two or more helical paths coaxial with and surrounding one another, so that a membrane may be led first around the inner helix, then back along the outwardly adjacent helix and so on. Such an arrangement provides a very compact former.

Where the supports are arranged in use in two or more helical paths it is preferred, in order to facilitate assembly and disassembly of the apparatus, to make the supports forming helices other than the innermost one removable, so that the membrane may first be wound around the inner helix from end to end thereof, whereafter the supports of the outwardly adjacent helix are placed in position and the filtering tube led back along them, and so on. In such an arrangement we prefer to assemble the removable supports in longitudinal groups on elongate base members or carriers extending lengthwise of the former and mountable in end support plates at the ends thereof.

It is intended that the scope of the invention should extend to such an assembly of supports and thus viewed from another aspect the invention provides, for use in a former as above set forth, a support assembly comprising an elongate carrier having several of said apertured supports mounted thereon, preferably loosely, in spaced relationship along the length thereof.

Although the membrane may be of any cross-sectional shape, such as square, triangular or polygonal, it is preferably of cylindrical form and the supports may then comprise rings having an opening for the ingress and egress of the membrane and each provided at a point diametrically opposite to such opening with means for securing it in position; such means may conveniently comprise a split-pin passing through a radial hole in the ring wall and engageable in a further hole in a spigot or carrier so that the ring is loosely mounted and may thus take up any position dependent on the position taken up by the membrane when it is filled with liquid.

Although the apertured supports can very conveniently take the form of individual apertured rings, other forms thereof are possible such as, for example, apertures formed in sheet material.

When in use in filtration or dialysis apparatus the said former will be mounted in a closed chamber for the reception of filtrate, with a membrane mounted thereon and entering and leaving the chamber through suitable airtight openings. The membrane is preferably formed of a synthetic material such as Cellophane (Registered Trade Mark), which has suitable semi-permeable properties. This presents certain difficulties in the formation of a satisfactory non-leaking connection between the membrane and a further metal tube, formed of stainless steel for example, which will usually be mounted in an end closure plate of the said chamber and through which liquid to be filtered will be introduced into the membrane.

A suitable releasable coupling for interconnecting the membrane and such a tube to form a continuous fluid-tight passage therethrough comprises sleeve means communicating with an opening in the wall of said chamber having a tapered bore for the reception of an end portion of the membrane and having an external screw-thread, a rigid tube having an externally tapered portion at one end thereof adapted to fit within said bore with the end portion of said membrane between itself and said bore, and a locking nut engageable with abutment means on said rigid tube and threadable on said sleeve means so as, when tightened on the latter, to cause the membrane to be wedged between the tapered portion of said rigid tube and said bore.

Preferably means will be provided for rigidly yet detachably securing said sleeve means relatively to said opening in the wall of said chamber through which the open end of the membrane passes; such means may comprise a short tubular member secured to the outside of the chamber and encircling said opening, such tubular member being adapted to receive the said sleeve means (or part thereof) therein and being formed with an external screw-thread, the sleeve means being fixed in position by a further locking nut engageable with an abutment thereon and threadable on said tubular member. Such locking nut may if desired form a part of the sleeve means in that it may itself be formed with the external screw-thread on which the first-mentioned locking nut is engaged to secure said rigid tube to the sleeve means.

The said rigid tube may, of course, be of any required length or configuration but is preferably comparatively short so that it may form an integral part of the filtration apparatus to which other tubes may, if desired, be connected.

This invention is applicable not only to filtration or dialysis apparatus for the laboratory but also to such apparatus for use on an industrial scale.

In order that the invention may be more readily understood one embodiment of the same will now be described by way of example and with reference to the accompanying drawings, in which:

FIG. 1 is a medial longitudinal section, partly diagrammatic, through one end of a filtration or dialysis apparatus incorporating a former according to the invention;

FIG. 2 is a transverse cross-section through such apparatus; and

FIG. 3 is an elevation of one end of elongate base member forming part of the former, showing its mode of mounting in the chamber.

Referring first to FIG. 1, this embodiment of the filtration or dialysis apparatus according to the invention comprises an airtight chamber in the form of a cylindrical tube 1 formed of rigid material preferably Pyrex glass and provided with end closure plates in the form of stainless steel discs 2, rubber gaskets 3 being interposed between such discs and the ends of the tube 1.

FIG. 1 shows only one end of the filtration or dialysis apparatus, the construction of the other end being exactly similar.

Each end closure plate 2 is formed with a central aperture 4, through which apertures passes a central tie-rod 5, formed of metal, which is coaxial with the tubular chamber 1 and extends outwardly at 6 beyond both ends of the latter for a substantial distance, e.g. in the order of 3 to 4 inches. As its upper end the tie-rod is formed with an axial bore 7 opening into the interior of the chamber 1 and thus providing a communication between the latter and the outside atmosphere for evacuation of the chamber.

The closure plate 2 at each end of the chamber 1 has welded to its external surface, centrally thereof, a short tubular member 8 which thus surrounds the tie-rod 5 where it extends outwardly of the chamber. This tubular member 8 receives a rubber bung 9 formed with a central bore which makes a close fit over the tie-rod 5, which is formed with an external screw-thread 10 in the region of the top surface of the bung 9, onto which a locking nut 11 is tightly screwed so as to bear down on the bung through a suitable washer 12 and thus expand the bung radially into close contact with the outside of the tie-rod 5, the inside of the tubular member 8 and the top surface of the closure plate 2 so as to seal the opening in the closure plate through which the tie-rod passes.

The said tie-rod forms part of a former for a tubular membrane 12 of the apparatus, the remaining parts of which former are housed entirely within the tubular chamber 1. Thus, the tie-rod provides a direct support for three groups of supports 13 (see FIG. 2) which together form an inner helix for the support of the membrane 12. Each of such supports comprises a metal ring formed with a narrow gap 14 in its perimeter (extending over a radial distance in the order of 25° of arc) and formed at a point diametrically opposite to such gap with an opening through which passes a split-pin 15 having its head inside the ring 13. The ends of the split-pin are received in an opening in the end of a short tubular spigot 16 the other end of which is rigidly secured to the tie-rod 5 so that the spigot 16 extends radially of the latter. The spigots 16 are arranged in three numerically equal groups, all of the spigots of each group being parallel and the groups being arranged around the tie-rod 5 at intervals of 120°. The groups are slightly staggered longitudinally relatively to one another, with the result that the supports 13 lie on a helix extending over the major part of the length of the chamber 1. It will be understood that the connection of the rings 13 to the spigots 16 by split-pins 15 in the manner described results in their being loosely mounted relatively to the spigots.

Near to each end of the chamber, and adjacent the point at which the bore 7 in the tie-rod 5 opens thereinto, a top supporting disc 17 for two more helical series of supporting rings 13 is mounted coaxially on the tie-rod 5 and is secured thereto by a set-screw 18 passing through a boss 19 integral with the disc 17 and embracing the tie-rod. The supporting disc is formed with six slots to receive the upper ends of six elongate carriers in the form of bars 20 which support the further series of rings 13 and are arranged on two circles concentric with the helix already described. Near to the ends thereof not visible in FIG. 1, i.e. the lower ends, the bars 20 are formed with rebates 21 (see FIG. 3) engageable in suitably positioned slots 22 in the bottom disc 17 in such manner that, upon axial rotation of the bars through 90° subsequent to such engagement, they are locked against longitudinal movement. To prevent inadvertent axial rotation during use the bars 20 are each provided with a pivotally mounted locking hook 23 engageable in a hole 24 formed in the bottom disc 17 near to each of the slots 22 therein when the bar 20 is correctly positioned for the prevention of its longitudinal movement, a tension spring 25 being connected between the locking hook 23 and the bar 20 to hold the hook in its locking position.

Each said vertical bar 20, all of which form part of the former of the invention, is formed with a number of suitably spaced apertures 26 (FIGS. 1 and 2) in which rings 13 are mounted by means of split-pins 15 in the manner already described, the rings 13 being arranged around each set of three bars 20 so as to lie on medial and outer helices.

In this embodiment the membrane 12 of the apparatus is in the form of a Cellophane tube, which is mounted on the former before the latter is mounted in the chamber 1. It will be understood that by releasing the locking nuts 11, the tie-rod 5 may be released from the closure plates 2 and the latter removed, whereafter the whole former may be withdrawn from the tubular chamber 1.

The six bars 20 carrying the medial and outer series of supports 13 are then removed and the membrane is wound on the inner helical series of rings 13 by flattening it and passing it through the gap in each of the rings in turn. The bars 20 carrying the medial series of rings are then remounted and the membrane returned around the medial helix; lastly the outermost bars are remounted and the membrane engaged in the outer helical series of rings 13.

The complete former and the membrane are then remounted in the chamber as described above.

At each of its ends, the membrane 12 is connected to a stainless steel tube 27 at the exterior of the chamber 1 through a coupling which will now be described. A cylindrical opening 28 in each end closure plate 2 is surrounded by a short tubular member 29 welded to the outside face of the closure plate 2 and formed with an external screw-thread 30. A sleeve 31 formed of Teflon (Registered Trade Mark) or other similar material fits into the tubular member 29 externally of the chamber 1 and abuts at its inner end against a sloping shoulder 32 formed in the bore of such member, to which it is secured by a lock nut 33 formed with an internal shoulder 34 abutting an external shoulder 35 of the sleeve 31 and screwed on to tubular member 29.

The membrane is drawn through the bore of the sleeve 31, the outer portion of which is tapered towards the interior of the chamber 1, until about 1″ of the membrane extends outwardly beyond the sleeve. The stainless steel tube 27, which is formed with an external taper complementary with the taper of said sleeve bore, is then inserted in such bore so that it traps the end of the membrane between itself and the bore and a continuous passage is thereby formed through the membrane and the stainless steel tube 27. The tube 27 is then clamped in the bore of the sleeve 31 by means of a further lock nut 36 having an internal shoulder 37 which engages with an external shoulder 38 on the stainless steel tube 27, the lock nut 36 being threaded on a screw-thread 39 on the lock nut 33 so that, upon its being tightened, the end of the membrane is wedged between the complementary tapers on the stainless steel tube 27 and the sleeve 31 and an airtight seal is thus obtained. The stainless steel tube 27 may be formed at its outer end with means for connecting it to a further tube or to any other apparatus such as a pump for introducing the liquid to be filtered.

A suitable plug 40 is provided in one or both of the end closure plates 2 of the chamber for the introduction and/or extraction of filtrate.

One end of the tie-rod 5 may, if desired, be threaded so as to be mountable on a support for the whole apparatus.

We have found that a particularly suitable filter tube may be formed from $\frac{5}{32}$″ diameter Viskings regenerated cellulose tubing.

It will be understood that the looseness of the mounting of the above described supporting rings 13 enables them to adopt positions most suitable for the support of the membrane when the latter is filled with liquid to be filtered. If desired, the said bars 20 carrying the medial and outer supporting rings 13 may be so arranged that, in use, they lie closely adjacent the gaps 14 in the inner and medial supporting rings respectively so as to close the latter, although such an arrangement is not essential as, upon expansion when filled with liquid, the membrane does not tend to bulge through such gaps.

We claim:
1. A former for supporting a tubular semi-permeable flexible membrane in filtration or dialysis apparatus, including a plurality of unitary ring-like supports arranged to externally embrace and support said membrane therein at intervals along its length in a compact predetermined coiled configuration free from sharp transitions in direction, each ring-like support having a peripheral gap through which the membrane, when in a flattened condition, can be passed laterally into the support.

2. A former as claimed in claim 1 wherein said supports are arranged to support said membrane in a helical path.

3. A former as claimed in claim 2 including a central supporting shaft lying on the axis of said helical path, said supports being positioned around said shaft and being mounted thereon.

4. A former according to claim 3 in which said supports are mounted on said shaft on short spigots extending generally radially from said shaft.

5. A former according to claim 4 in which three equiangularly spaced supports are provided for each turn of said membrane around said shaft.

6. A former according to claim 2 including further ring-like supports arranged to support said member in at least one further helical path coaxial with and surrounding the first said helical path; the arrangement being such that a membrane may be led first around the innermost helical path, then back along the outwardly adjacent helical path and so on.

7. A former according to claim 6 including means releasably supporting said further ring-like supports to enable the membrane to be led first around the first helical path before mounting the supports for the next surrounding helical path in the former and so on.

8. A former according to claim 7 in which said further supports are arranged in groups of a plurality of supports each, each group of supports being mounted in spaced relationship on an elongate carrier extending lengthwise of the former.

9. A former according to claim 8 including end support plates and in which each said carrier is removably mounted at the ends thereof in said end support plates.

10. A former as claimed in claim 1 wherein said ring-like supports each comprise an individual ring and mounting means thereon at a point diametrically opposite to said gap therein.

11. A former as claimed in claim 1 including means mounting said supports for limited substantially universal freedom of movement so that when a membrane supported thereby is filled with liquid said supports, may take up positions coaxial with said membrane so as to minimize kinking thereof.

12. A former as claimed in claim 11 wherein at least some of said supports are mounted for rotation about axes perpendicular to their own axes.

13. Filtration or dialysis apparatus as claimed in claim 1 in which said former is mounted within means defining a chamber provided with inlet and outlet couplings for establishing connections with a membrane mounted on said supports, each said coupling comprising sleeve means communicating with an opening in the wall of said chamber having a tapered bore for the reception of an end portion of the membrane and having an external screw-thread, a rigid tube having an externally tapered portion at one end thereof adapted to fit within said bore with the end portion of said membrane between itself and said bore, and a locking nut engageable with abutment means on said rigid tube and threadable on said sleeve means so as, when tightened on the latter, to cause the membrane to be wedged between the tapered portion of said rigid tube and said bore.

14. Filtration or dialysis apparatus as claimed in claim 13 in which said sleeve means is rigidly yet detachably secured relative to said opening in the wall of said chamber.

15. A former as defined in claim 1 including an elongated carrier having a plurality of said supports mounted thereon in spaced relationship along the length thereof.

References Cited by the Examiner

UNITED STATES PATENTS

| | | | |
|---|---|---|---|
| 422,676 | 3/1890 | Willard | 210—249 X |
| 2,397,291 | 3/1946 | Robertson | 248—68 |
| 2,542,442 | 2/1951 | Weber | 248—68 |
| 2,715,097 | 8/1955 | Guarino | 210—321 |
| 2,765,136 | 10/1956 | Knapp | 248—49 |
| 3,199,680 | 8/1965 | Schiff | 210—324 X |

FOREIGN PATENTS 549,086  4/1932  Germany.

REUBEN FRIEDMAN, *Primary Examiner.*

F. SPEAR, *Assistant Examiner.*